United States Patent
Chen et al.

(10) Patent No.: US 9,104,281 B2
(45) Date of Patent: Aug. 11, 2015

(54) TOUCH PANEL

(71) Applicants: Kuo-Hsing Chen, New Taipei (TW);
Yu-Ting Chen, Taoyuan County (TW);
Chen-Hao Su, Taichung (TW);
Chin-Chang Liu, Taichung (TW)

(72) Inventors: Kuo-Hsing Chen, New Taipei (TW);
Yu-Ting Chen, Taoyuan County (TW);
Chen-Hao Su, Taichung (TW);
Chin-Chang Liu, Taichung (TW)

(73) Assignees: WINTEK CHINA TECHNOLOGY LTD, Dongguan (CN); WINTEK CORPORATION, Taichung (CN)

( * ) Notice: Subject to any disclaimer, the term of this patent is extended or adjusted under 35 U.S.C. 154(b) by 215 days.

(21) Appl. No.: 13/938,247

(22) Filed: Jul. 10, 2013

(65) Prior Publication Data
US 2014/0014489 A1    Jan. 16, 2014

(30) Foreign Application Priority Data
Jul. 10, 2012   (TW) .............................. 101124810 A

(51) Int. Cl.
*G06F 3/045* (2006.01)
*G06F 3/044* (2006.01)

(52) U.S. Cl.
CPC ................ *G06F 3/044* (2013.01); *G06F 3/045* (2013.01)

(58) Field of Classification Search
CPC ....................................................... G06F 3/044
See application file for complete search history.

(56) References Cited

U.S. PATENT DOCUMENTS

2009/0267916 A1* 10/2009 Hotelling ...................... 345/174
2010/0163394 A1*  7/2010 Tang et al. .................... 200/600
2010/0321326 A1* 12/2010 Grunthaner et al. .......... 345/174

* cited by examiner

*Primary Examiner* — Lixi C Simpson
(74) *Attorney, Agent, or Firm* — Ming Chow; Sinorica, LLC

(57) ABSTRACT

A touch panel including sensing electrode sets, first pads, second pads, first conductive lines, second conductive lines and resistors is provided. Each sensing electrode set includes a first sensing electrode pattern and second sensing electrode patterns disposed beside the first sensing electrode pattern. The first conductive lines electrically connect the first sensing electrode pattern with the first pads respectively. The second conductive lines connect the second electrode patterns into multiple series. The second sensing electrode patterns of the same sensing electrode set belong to different series and two terminals of each series are connected to different second pads. Two terminals of each resistor are connected to the different second pads connected with the two terminals of the each series.

15 Claims, 2 Drawing Sheets

TOUCH PANEL

CROSS-REFERENCE TO RELATED APPLICATION

This application claims the priority benefit of Taiwan application serial no. 101124810, filed on Jul. 10, 2012. The entirety of the above-mentioned patent application is hereby incorporated by reference herein and made a part of this specification.

TECHNICAL FIELD

The invention relates to a touch panel, more particularly to a touch panel with an improved touch sensing quality.

BACKGROUND

In recent years, information technology, wireless mobile communication, and information household appliances have been rapidly developed and applied. In order to achieve the objective of being easily portable, more compact, and more user friendly, the inputting device in many information products has been transformed from the traditional keyboard or mouse to a touch display panel. Currently, a touch panel can be roughly categorized into a restive type, a capacitive type, an acoustic type and an optical type, etc.

In a capacitive touch panel, the design of a sensing device includes a plurality of X-sensing electrode series and a plurality of Y-sensing electrode series, wherein the Y-sensing electrode series and the X-sensing electrode series are interlacing arranged. Further, one type of capacitive touch sensing panel uses a plurality of mutually independent sensing electrodes to conduct the sensing function. In this type of design, different sensing electrodes are respectively connected to a driver circuit via a corresponding conductive line. The length differences of the conductive lines would lead to inconsistency in the signal transmission quality. Hence, this type of design would result with varying quality of signal transmission, which ultimately would lead to sensing errors.

SUMMARY

An exemplary embodiment of the invention provides a touch panel in which the touch sensing quality is enhanced.

An exemplary embodiment of the invention provides a touch panel that includes a substrate, a plurality of sensing electrode sets, a plurality of first pads, a plurality of second pads, a plurality of first conductive lines, a plurality of second conductive lines, and a plurality of resistors. The sensing electrode sets are disposed on the substrate, wherein each sensing electrode set includes a first sensing electrode pattern and a plurality of second sensing electrode patterns. The second sensing electrode patterns are disposed beside the first sensing electrode pattern. The first pads and the second pads are disposed on the substrate. The first conductive lines connect the first sensing electrode patterns to the first pads respectively. The second conductive lines connect the second sensing patterns of the sensing electrode sets to a plurality of series, wherein the second sensing electrode patterns of a same sensing electrode set belong to different series, and two terminals of each series respectively connect to two different second pads. The two terminals of each resistor respectively connect to the two different second pads that are connected to the two terminals of each series.

According an exemplary embodiment of the disclosure, the above touch panel further comprises a circuit board. The circuit board may be connected with the first pads and the second pads, and the resistors are disposed on the circuit board. Herein, the resistors include surface mount resistors.

According to an exemplary embodiment of the disclosure, the first sensing electrode pattern of each of the above sensing electrode sets has a strip pattern that extends along a first direction, and the second electrode patterns of each sensing electrode set are arranged along the first direction. For example, the second sensing electrode patterns in two neighboring sensing electrode sets connected to the same series are located at different positions along the first direction.

According to an exemplary embodiment of the disclosure, the first conductive lines and the second conductive lines do not intersect with each other, the second conductive lines do not intersect with each other, and the first conductive lines do not intersect with each other.

According to an exemplary embodiment of the disclosure, the above resistors are disposed on the substrate, and each resistor is disposed between two different second pads connected to two terminals of a same series.

According to an exemplary embodiment of the disclosure, the above neighboring two first sensing electrode patterns are disposed with a plurality of second sensing electrode patterns therebetween.

According to an exemplary embodiment of the disclosure, the above sensing electrode sets are fabricated from a same film layer.

According to an exemplary embodiment of the disclosure, the first conductive lines and the second conductive lines are fabricated from a same film layer.

According to the touch panel of the exemplary embodiments of the disclosure, each sensing electrode set includes at strip-shaped first sensing electrode pattern and a plurality of second sensing electrode patterns configured adjacent to the first sensing electrode pattern. The second sensing electrode patterns of the different sensing electrode sets are serially connected to form a series via the second conductive lines. The two ends of each series are respectively connected to different second pads, and the plurality of second sensing electrodes is driven through the same second pads. Moreover, the two ends of each series are further connected to the two ends of a resistor for adjusting the resistances of the different series to enhance the quality of a touch panel.

The invention and certain merits provided by the invention can be better understood by way of the following exemplary embodiments and the accompanying drawings, which are not to be construed as limiting the scope of the invention.

DETAILED DESCRIPTION OF DISCLOSED EMBODIMENTS

Figure 1:
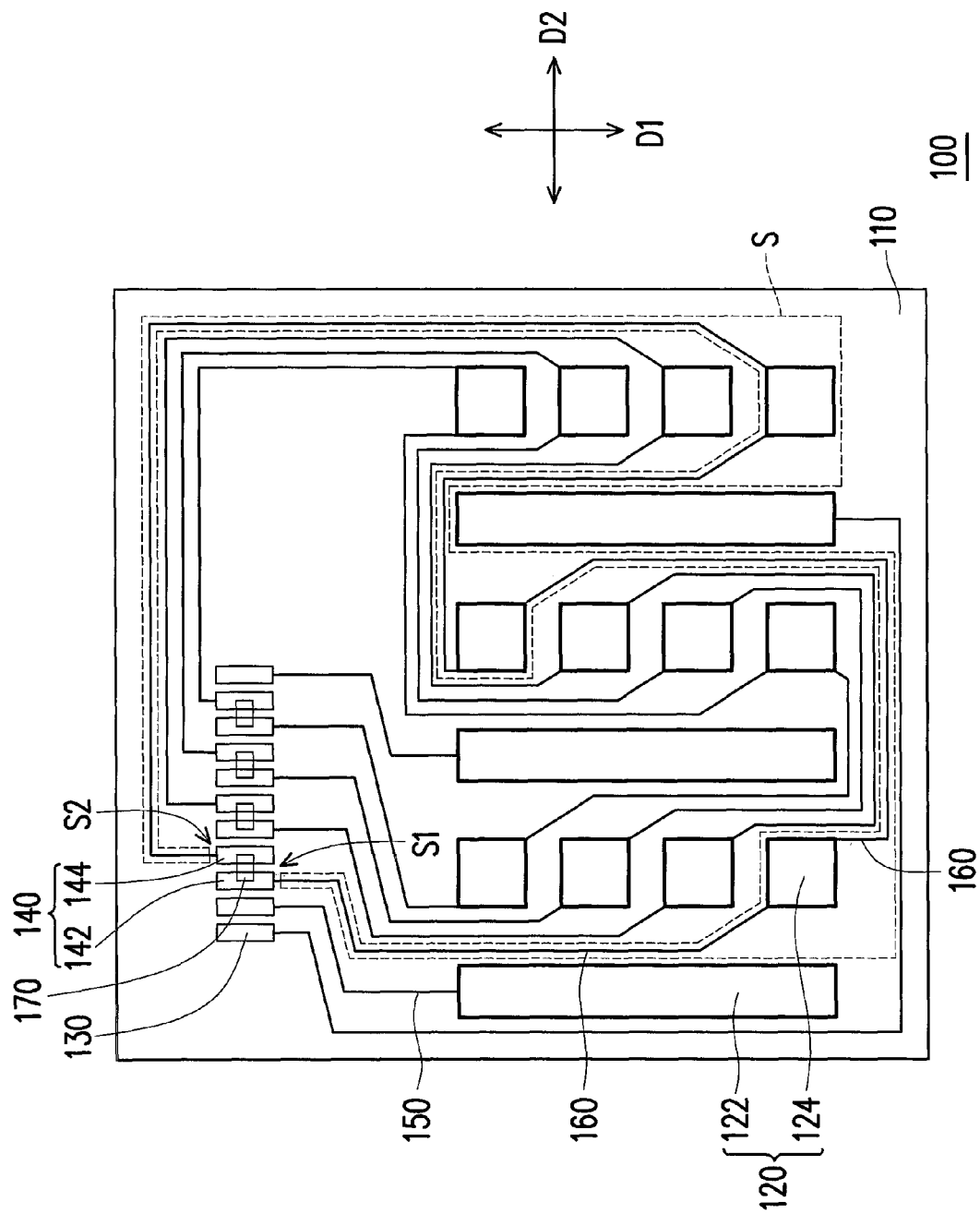
FIG. 1 is a schematic diagram of a touch panel according to an exemplary embodiment of the disclosure.

FIG. 1 is a schematic diagram of a touch panel according to an exemplary embodiment of the disclosure. Referring to FIG. 1, a touch panel 100 includes a substrate 110, a plurality of sensing electrode sets 120, a plurality of first pads 130, a plurality of second pads 140, a plurality of first conductive lines 150, a plurality of second conductive lines 160 and a plurality of resistors 170. The sensing electrode sets 120, the first pads 130, the second pads 140, the first conductive lines 150 and the second conductive lines 160 are all disposed on the substrate 110. Each sensing electrode set 120 includes a first sensing electrode pattern 122 and a plurality of second sensing electrode patterns 124. The second sensing electrode patterns 124 are disposed beside the first sensing electrode pattern 122. The first conductive lines 150 electrically connect the first sensing electrode patterns 122 to the first pads 130, respectively. The second conductive lines 160 electrically connect the second sensing electrode patterns 124 of the plurality of sensing electrode sets 120 to form a plurality of series S. The second sensing electrode patterns 124 of each of the sensing electrode sets 120 belong to different series S respectively. Two terminals of each resistor 170 are respectively connect to two terminals S1, S2 of each series S. Besides, the substrate 110 may be a cover lens, such as a cover glass. Furthermore, a decoration border with an optional symbol or text may be disposed on the substrate 110. In other exemplary embodiment, the substrate may be a substrate of a display, such as a color filter substrate of a TFT-LCD, but is not limited to.

More specifically, the first sensing electrode pattern 122 of each sensing electrode set 120 has a strip pattern that extends along a first direction D1 and the second sensing electrode patterns 124 of each sensing electrode set 120 are arranged along the first direction D1. A plurality of second sensing electrode patterns 124 are disposed at the side of each of the first sensing electrode patterns 122, and the strip shaped first sensing electrode patterns 122 and the second sensing electrode patterns 124 are alternately arranged along the second direction D2, wherein the first direction D1 can be intersected with or perpendicular to the second direction D2. The second sensing electrode patterns 124 are disposed between any two neighboring first sensing electrode patterns 122.

In the touch panel 100, these first sensing electrode patterns 122 are sequentially scanned for the second sensing electrode patterns 124 that belong to the same sensing electrode set 120 to concurrently read the touch signal (i.e. performing the sensing operation). The plurality of second sensing electrode patterns 124 of the same sensing electrode set 120 must be electrically independent to accurately determine the touch position along the first direction D1 to achieve the touch sensing function. In other words, the chip that drives the touch panel 100 must be able to independently control the plurality of the second sensing electrode patterns 124 belonging to the same sensing electrode set 120. In the existing designs, the second sensing electrode patterns 124 are respectively connect to the chip through one second pad 140. Hence, the number of the second pads is at least equal to the number of the second sensing electrode patterns 124. However, this type of design would require the touch panel 100 to have a larger pad area. Moreover, the connection of the pads and the chip becomes more difficult due to an increasing number of the pads. Hence, in this exemplary embodiment, the second sensing electrode patterns 124 belonging to different sensing electrode sets 120 are connected as a same series S by the second conductive lines 160 to reduce the number of the second pads 140 and the area for disposing the pads. For example, the touch panel 100 in FIG. 1 includes three sets of sensing electrode sets 120, and each sensing electrode set 120 includes 4 second sensing electrode patterns 124. Accordingly, the touch panel 100 includes a total of 12 second sensing electrode patterns 124, and the second conductive lines 160 connect the 12 second sensing electrode patterns 124 into 4 series S, while each series S includes one of the second sensing patterns 124 of each set of the three sensing electrode sets 120. Hence, all of the second sensing electrode patterns 124 can be connected with 8 second pads 140 to reduce the number of the second pads 140. In other exemplary embodiments, the number of the sensing electrode sets 120 in the touch panel 100 may be altered according to the various designs. It should be noted that the number of the electrode sets in the foregoing description and examples are intended for illustration, not for limitation the scope of the disclosure.

More specifically, these sensing electrode sets 120, from left to right along the second direction D2, are respectively depicted as the first to the third sensing electrode sets 120, and the second sensing electrode patterns 124 of each set of the sensing electrode sets 120, from top the bottom along the first direction D1, are depicted as the first to the fourth ones of the second sensing electrode patterns 124. In this exemplary embodiment, the first one of the second sensing electrode patterns 124 in the first set of the sensing electrode sets 120, the fourth one of the second sensing electrode patterns 124 in the second set of the sensing electrode sets 120, the first one of the second sensing electrode patterns 124 in the third set of the sensing electrode sets 120 are serially connected as one series S via the second conductive lines 160. The second one of the second sensing electrode patterns 124 in the first set of the sensing electrode sets 120, the third one of the second sensing electrode patterns 124 in the second set of the sensing electrode sets 120, the second one of the second sensing electrode patterns 124 in the third set of the sensing electrode sets 120 are serially connected as another series S via the second conductive lines 160. The third one of the second sensing electrode patterns 124 in the first set of the sensing electrode sets 120, the second one of the second sensing electrode patterns 124 in the second set of the sensing electrode sets 120, the third one of the second sensing electrode patterns 124 in the third set of the sensing electrode sets 120 are serially connected as another series S via the second conductive lines 160. Moreover, the fourth one of the second sensing electrode patterns 124 in the first set of the sensing electrode sets 120, the first one of the second sensing electrode patterns 124 in the second set of the sensing electrode sets 120, the fourth one of the second sensing electrode patterns 124 in the third set of the sensing electrode sets 120 are serially connected as another series S via the second conductive lines 160. It is understood by a person of ordinary skill practicing the exemplary embodiment of the disclosure that the foregoing description of the ways of serially connecting the second sensing electrode patterns 124 should be regarded as illustrative rather than restrictive. Many modifications and variations, and different combinations thereof, can be implemented in accordance with the present invention. It should also be noted that different ways of the serial connection will lead to different layouts of the second conductive lines.

It should also be noted that the second sensing electrode patterns 124 are serially connected to form the plurality of the series S via the second conductive lines 160 using different methods. Further, these second conductive lines 160 do not intersect with each other and can be fabricated with a same film layer. Hence, during the fabrication of a touch panel 100, the application of multiple masks to perform multiple patterning processes for completing the layout of the second conductive lines 160 can be precluded. Moreover, in this exemplary embodiment, the first conductive lines 150 and the second conductive lines 160 do not intersect with each other, and the first conductive lines 150 do not intersect with each other. Hence, the first conductive line 150 and the second conductive line 160 can be fabricated using the same film layer. Accordingly, the number of process steps required in fabricating isolation layers for the different conductive layers may be reduced to lower the fabrication cost and the processing time. Moreover, the sensing electrode sets 120 do not intersect with each other; hence, they can be fabricated using the same film layer.

Generally speaking, a touch panel 100 may use a same conductive film layer to form these touch sensing electrode sets 120, the first conductive lines 150 and the second conductive lines 160, and even the first pads and the second pads 140. Alternatively speaking, the touch panel 100 may use only one layer of conductive layer to fabricate the required touch sensing electrodes and conductive lines; hence the manufacturing cost and the processing time can be greatly reduced. The exemplary embodiments of the disclosure are not limited as such. In other exemplary embodiments, different conductive films may be used to form these sensing electrode sets 120, the first conductive lines 150 and the second conductive lines, and even the first pads 130 and the second pads 140. For example, the sensing electrode sets 120 may be fabricated using a transparent conductive layer, while the first conductive lines 150, the second conductive lines 160, the first pads 130 and the second pads 140 may be fabricated with another type of conductive material, rather than the transparent conductive material.

Further, in the touch panel 100, the plurality of series S that are serially connected with the second conductive lines 160 have different routing lengths; hence, the plurality of series S have different resistances. Accordingly, the signals that are transmitted to the chip and read by the different second sensing electrode patterns 124 vary in different degrees due to the non-uniformity of the resistance. Therefore, an erroneous determination may be made by the chip because the received signal is different from the actual sensing signal. Ultimately, the touch sensing accuracy is lower and the quality of the touch panel 100 becomes undesirable.

However, in the touch panel 100 of the exemplary embodiment of the disclosure, different series S are parallelly connected with one of the resistors 170, and the resistors 170 of the different series S can have different resistances. Alternatively speaking, the resistors 170 have at least two or more types of resistance. In other exemplary embodiment, the resistors 170 may have the same resistance because the smaller the resistance of the resistors 170 than the resistance of each series S is, the lesser the overall resistance variation between the different resistors 170 and the corresponding series S is. This type of parallelly-connected design aids the adjustment of the equivalent resistance of each series S; hence, the signal variation of the different second sensing electrode patterns 124 owing to the transmission resistance is more consistent and the touch sensing accuracy is enhanced. Moreover, based on the equation of parallel resistors in electronic study, the equivalent resistance of each series S is lowered after each series is parallelly connected to a resistor 170. In other words, the overall resistance of each series is reduced to lower the loading of the chip.

Herein, the ways that each series S and one of the resistor 170 being parallelly connected include, for example, the two terminals S1, S2 of each series S respectively connect to different second pads 142, 144, and the two terminals of each resistor 170 are respectively connected to different second pads 142, 144 that are respectively connected to the two terminals S1, S2 of each series. It should be noted that the exemplary embodiment of the disclosure is limited as such. Moreover, in this exemplary embodiment, the resistors 170 can be configured directly on the substrate 110, for example, a meandering shape conductive pattern configured on the substrate 110 or a conductive pattern with different line widths.

In addition, in this exemplary embodiment, the resistors 170 that are parallelly connected with the different series S may have different resistances. For example, the greater the resistance of the series S itself is, the smaller the resistance of the resistor 170 that is parallelly connected with the series S is. For example, when two series respectively have resistances of 10 ohms and 5 ohms, then the series S having 10 ohms and the resistor having 5 ohms can be parallelly connected, and the series S having 5 ohms and the resistor 170 having 10 ohms can be parallelly connected. Accordingly, if the resistor 170 and the corresponding series S are viewed as a same unit, the equivalent resistance of each unit can be substantially the same. The signal transmission signal of each series is thereby maintained, and the touch sensing accuracy is enhanced.

Figure 2:
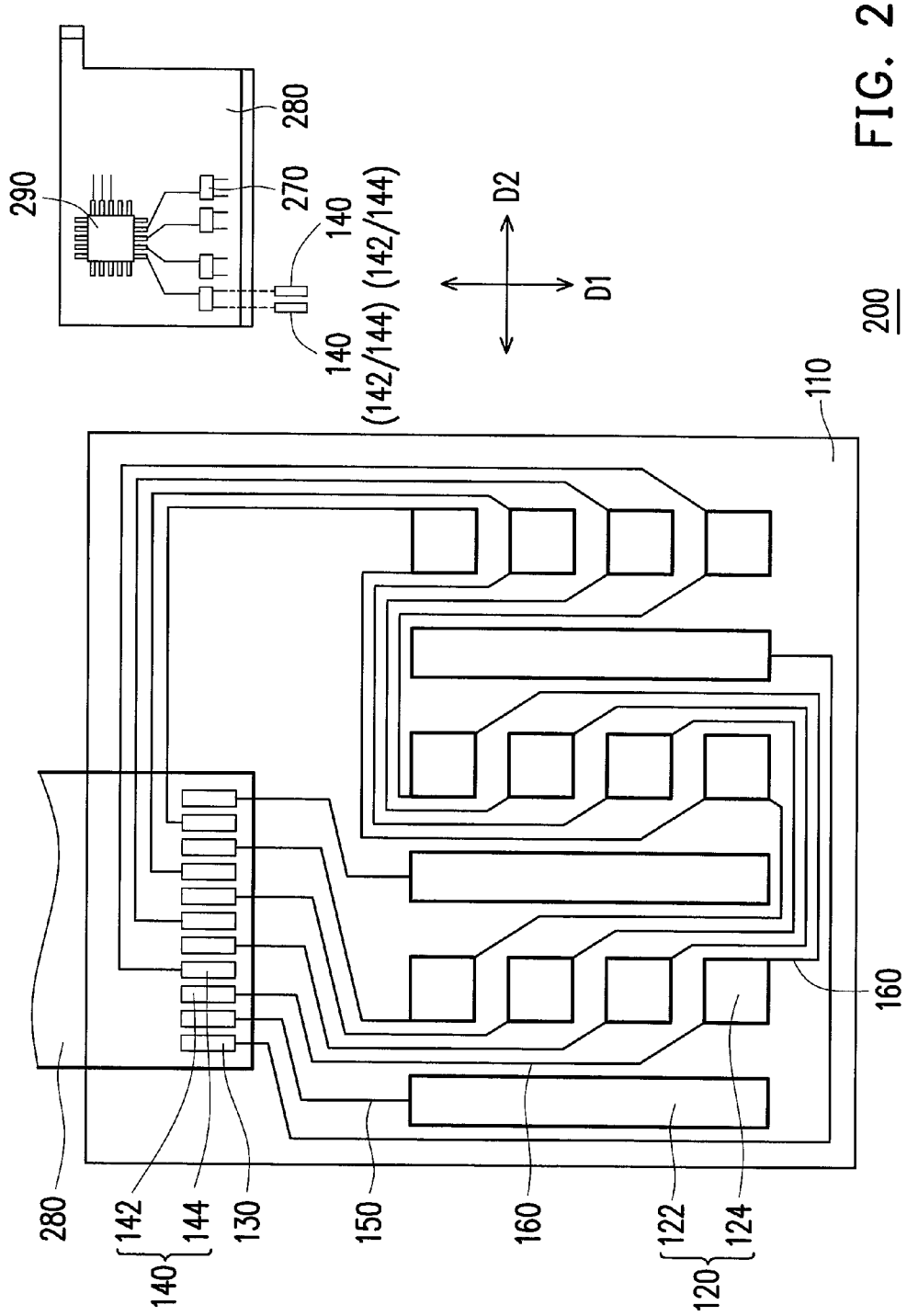
FIG. 2 is a schematic diagram of a touch panel according to another exemplary embodiment of the disclosure.

In other exemplary embodiments, the resistors 170 may be disposed indirectly on the substrate 110. For example, FIG. 2 is a schematic diagram of a touch panel according to another exemplary embodiment of the disclosure. Referring to FIG. 2, the touch panel 200 includes the previously disclosed substrate 110, multiple sensing electrode sets 120, multiple first pads 130, multiple second pads 140, multiple first conductive lines 150 and multiple second conductive lines 160, and further includes a circuit board 280 and a plurality of resistors 270 configured on the circuit board 280. Herein, the resistors 270 may include surface mount type resistors disposed on the circuit board 280, and the circuit board 280 may include flexible circuit board or printed circuit board. Moreover, the chip 290 may be disposed on the circuit board 280. In this exemplary embodiment, the two terminals S1, S2 of each series S respectively connected to different second pads 142, 144, and the design of the wire layer in the circuit board 280 may allow the two pads 142 and 144 of the same series S to respectively connect to the two terminals of one of the resistors 270 to accomplish the parallel connection of each series S and the corresponding resistor 270.

According to the above, in the touch panel of the exemplary embodiment of the disclosure, all the conductive structures do not intersect with each other; hence, a reduction of the fabrication cost can be accomplished. Further, the touch panel of the exemplary embodiment of the disclosure applies multiple conductive lines to serially connect the sensing electrode patterns of the different sensing electrode sets for the sensing electrode patterns of the different sensing electrode sets to connect with the chip via the same pads. Moreover, the multiple sensing electrode patterns are connected into series and are parallelly connected to a resistor. Accordingly, variations in the equivalent resistance of different sensing electrodes are reduced and the resistance of the sensing signal transmission route is lowered. Further, the quality of signal transmission is enhanced to accomplish a desirable touch sensing effect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
   a substrate;
   a plurality of sensing electrode sets, disposed on the substrate, wherein each of the plurality of sensing electrode sets comprises:
   a first sensing electrode pattern; and
   a plurality of second sensing electrode patterns, disposed beside the first sensing electrode pattern;

a plurality of first pads, disposed on the substrate;

a plurality of second pads, disposed on the substrate;

a plurality of first conductive lines, electrically connecting the first sensing pattern of each of the plurality of sensing electrode sets to the plurality of first pads, respectively;

a plurality of second conductive lines, serially connecting the plurality of second sensing patterns of the plurality of sensing electrode sets into a plurality of series, wherein the plurality of second sensing electrode patterns of a same set of the plurality of sensing electrode sets respectively belong to different series of the plurality of series, and two terminals of each of the plurality of series respectively connect to different second pads; and a plurality of resistors, two terminals of each of the plurality of resistors respectively connect to the different second pads that are connected to the two terminals of the each of the plurality of series.

2. The touch panel of claim 1 further comprising a circuit board, connected to the plurality of first pads and the plurality of second pads, wherein the plurality of resistors are disposed on the circuit board.

3. The touch panel of claim 2, wherein the plurality of resistors include surface mount type resistors.

4. The touch panel of claim 1, wherein the first sensing electrode pattern of the each of the plurality of sensing electrode sets has a strip pattern that extends along a first direction, and the plurality of second sensing electrode patterns of the each of the plurality of sensing electrode sets are arranged along the first direction.

5. The touch panel of claim 4, wherein the second sensing electrode patterns of the plurality of sensing electrode patterns, which are in two neighboring sensing electrode sets of the plurality of sensing electrode sets and connected to a same series of the plurality of series, are at different positions of the first direction.

6. The touch panel of claim 1, wherein the plurality of first conductive lines and the plurality of second conductive lines do not intersect with each other, the plurality of first conductive lines do not intersect with each other, and the plurality of second conductive lines do not intersect with each other.

7. The touch panel of claim 1, wherein the plurality of resistors is disposed on the substrate, and the each of the plurality of resistors is respectively disposed between the different second pads of the plurality of second pads connected to the two terminals of a same series of the plurality of series.

8. The touch panel of claim 1, wherein any two neighboring first sensing electrode patterns are disposed with multiple second sensing patterns therebetween.

9. The touch panel of claim 1, wherein the plurality of sensing electrode sets are constructed from a same film layer.

10. The touch panel of claim 1, wherein the plurality of first conductive lines and the plurality of second conductive lines are constructed from a same film layer.

11. The touch panel of claim 1, wherein the plurality of resistors have a same resistance.

12. The touch panel of claim 1, wherein the plurality of resistors have at least two different resistances.

13. The touch panel of claim 1, wherein the substrate is a substrate of a display.

14. The touch panel of claim 13, wherein the substrate of the display is a color filter substrate.

15. The touch panel of claim 1, wherein the substrate is a cover lens.

\* \* \* \* \*